United States Patent [19]

Stenhuis et al.

[11] 4,338,493
[45] Jul. 6, 1982

[54] METHOD AND DEVICES FOR REPORTING EMERGENCY CALLS AND FOR INITIATING EMERGENCY ASSISTANCE MEASURES

[75] Inventors: Derk Stenhuis, Rijswijk; Wouter J. Nieuwenhuizen, Zoetermeer, both of Netherlands

[73] Assignee: Siemens Aktiengesellschaft, Berlin & Munich, Fed. Rep. of Germany

[21] Appl. No.: 162,900

[22] Filed: Jun. 25, 1980

[30] Foreign Application Priority Data

Jun. 27, 1979 [NL] Netherlands ............... 7905018

[51] Int. Cl.³ .................................. H04M 11/04
[52] U.S. Cl. .......................... 179/5 R; 179/2 A
[58] Field of Search ........... 179/5 R, 5 P, 2 R, 2 A; 340/502, 503, 504, 506

[56] References Cited

U.S. PATENT DOCUMENTS 3,842,208 10/1974 Paraskevakos .................. 179/5 R
4,064,368 12/1977 Dibner ............................ 179/5 R
4,086,434 4/1978 Bocchi ............................ 179/5 R
4,241,237 1/1980 Paraskevakos et al. ......... 179/2 AM

FOREIGN PATENT DOCUMENTS 2319258 2/1977 France .
7709333 2/1979 Netherlands .

Primary Examiner—Jospeh A. Popek
Attorney, Agent, or Firm—Hill, Van Santen, Steadman, Chiara & Simpson

[57] ABSTRACT

For giving assistance to persons living alone in closed dwelling units, an emergency call report is transmitted in a communication system from an alarm location to an allocated alarm central authorized to receive. Thereby, with mutual identification, the connection is automatically completed to the alarm central via a public telephone dial network. An intercommunication connection with the person seeking assistance is controlled by the alarm central. In case a helper must enter the closed dwelling, a monitored access for the helper can be rendered possible proceeding from the alarm central. Thereby, the access authorization is monitored and the dwelling door is opened as well.

19 Claims, 4 Drawing Figures

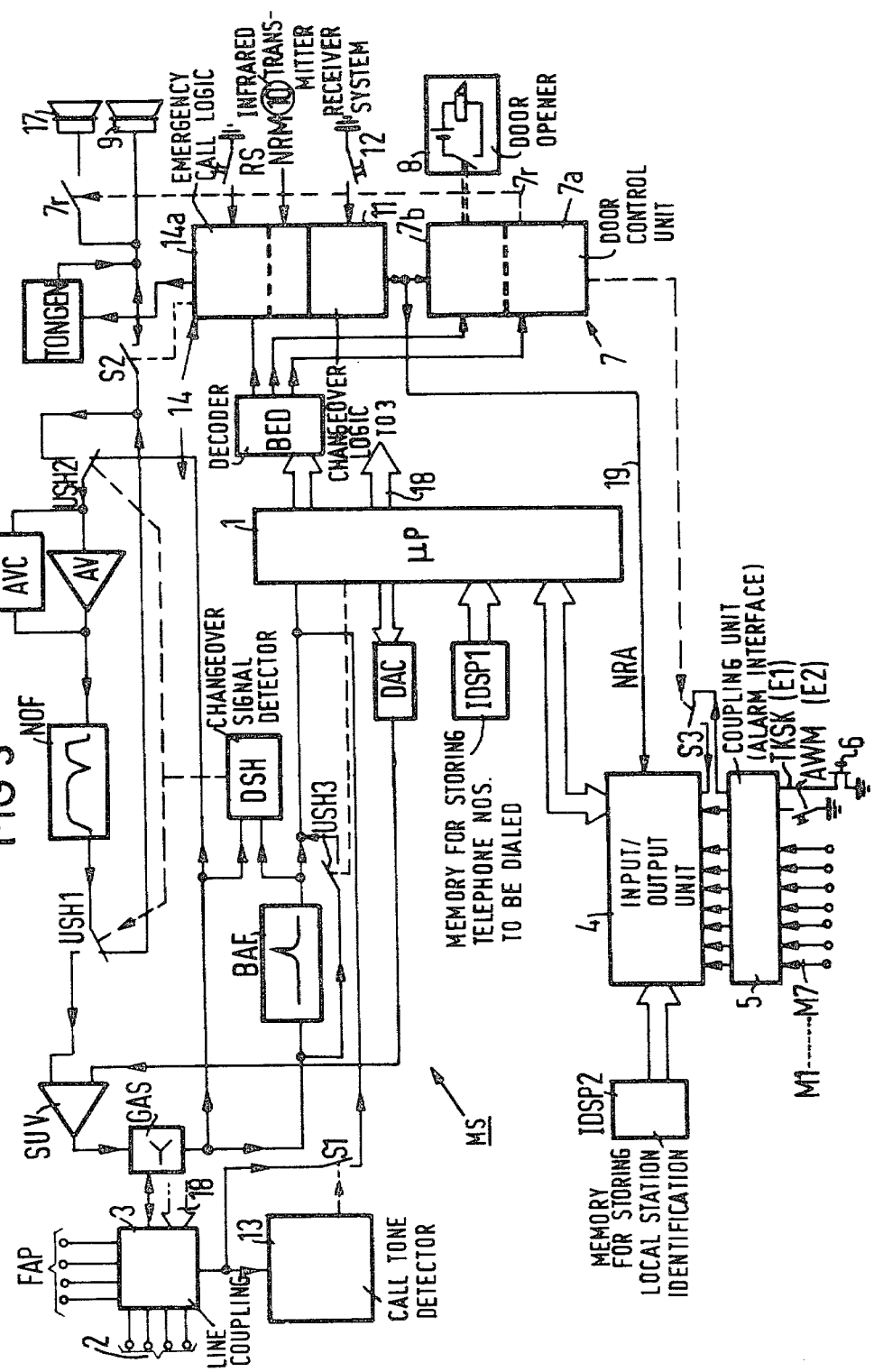

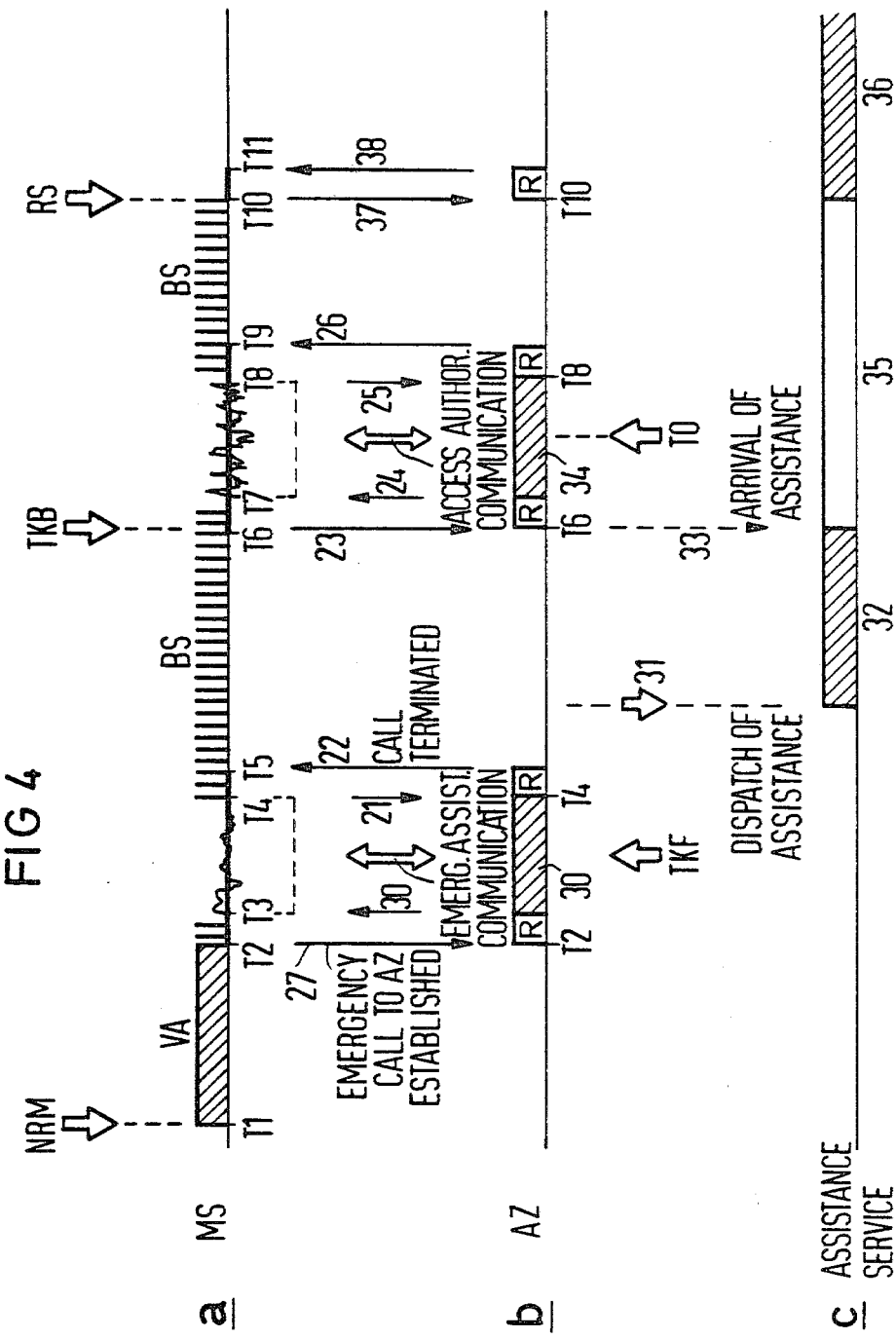

METHOD AND DEVICES FOR REPORTING EMERGENCY CALLS AND FOR INITIATING EMERGENCY ASSISTANCE MEASURES

BACKGROUND OF THE INVENTION

The invention relates to a method for reporting emergency calls and initiating emergency assistance measures by means of protected, encoded data transmission between one or more alarm centrals with reception authority and at least one alarm location via a communication network, whereby the alarm location installed in a closed dwelling unit includes an emergency call alarm unit and an emergency assistance communication unit and, on the basis of an emergency call report, automatically produces a connection to the alarm central and, by means of previous, mutual identification, guarantees that the emergency call and further information are only transmitted to the alarm central authorized for reception.

Elderly and/or physically handicapped persons who live alone in a closed dwelling unit are often afraid that no one will notice when they need assistance and they are no longer in a position to use their telephone. To this end, emergency assistance communication systems have been created. By merely pressing a button, a connection to a corresponding central station can be automatically produced and assistance can be requested.

Such emergency assistance communication systems are generally known. Frequently, these employ the public telephone network for the data communication. Thereby, it should be guaranteed for reasons of privacy and safety that a call for assistance only arrives at an authorized central station and a connection only arises between the authorized central and the corresponding subscriber station.

A communication system is described in the Dutch published patent application No. 77 09 333 in which a connection to a central station can be produced in emergency situations. Thereby, on the basis of an emergency call alarm, a connection from an alarm location to an allocated central station is produced and an intercommunication connection is switched via a loudpspeaker of the alarm location.

An emergency assistance communication system is likewise known from the U.S. Pat. No. 4,064,368 which produces a connection to a central station from which assistance can be sent via the public telephone network. The French published patent application No. 23 19 258 describes a remote monitoring system with the assistance of a public telephone network for sick or handicapped persons.

Assistance can be summoned with these and other known systems and a person suited to offer assistance can be sent to the dwelling of the person in need. If, however, for any reasons whatsoever, this person is not in a position to open the door himself, then the helper cannot get into the locked dwelling without further ado.

SUMMARY OF THE INVENTION

The object of the invention is to specify a method with which it is possible to enable access to a locked dwelling in which the person in need is situated. Thereby, access to the locked dwelling unit is to be controlled and rendered possible proceeding from the central station at which the emergency call report was registered.

This object is inventively achieved by means of the following method steps:

(a) after incidence of an emergency call report in an authorized alarm central and after a mutual identification procedure between the alarm central and the alarm location by means of coded signals, an intercommunication connection between the alarm central and the alarm location is produced which is controlled from the alarm central;

(b) a controlled door opening process is initiated from the alarm central, wherein a coded signal for activating a door opening control circuit is transmitted to the alarm location and, after termination of the voice traffic, the connection is released;

(c) after actuation of a doorbell button of the locked dwelling unit, a connection from the alarm location to the alarm central is again produced by the activated door opening control circuit and this is displayed at the alarm central;

(d) access authorization of a person coming to help is monitored from the alarm central by means of a door transmission device arranged at the door of the locked dwelling unit;

(e) after determination of authorization, the opening of the door is enabled from the alarm central by means of a further encoded signal and, subsequent thereto, the door opening control circuit is switched off. After further intercommunication with the dwelling unit is terminated, the connection is released.

This method is meant to guarantee that the assistance only ensues at the initiative of that person who is situated in the locked dwelling unit and has called for assistance and that only the authorized person has access to the dwelling after the authorization has been controlled by the central station. By so doing, protection of the personal living area is to be guaranteed.

In an advantageous manner, a preliminary alarm can be emitted as an acknowledgment signal in the alarm location after an emergency call report. Expediently, an acoustical acknowledgment signal will be emitted via a loudspeaker which is allocated to the communication unit. It can likewise be provided, after the alarm central has spoken with the person requesting assistance, to transmit a further signal from the alarm location in order to calm the person concerned until the helper, for example, an emergency doctor, who has been requested or promised arrives. The helper can then shut off the reassurance signal and reset the communication system to the idle condition and, thus, terminate the communication procedure. It can likewise be provided that the person who has initiated an emergency call report may interrupt completion of the connection to the alarm central or the door opening process at any time and reset the communication system.

However, it can be desirable or necessary that a locked dwelling unit of a person living alone is called at specific time intervals from an authorized alarm central and that the alarm location is placed in operation without individual initiative of the person in the dwelling unit, so that, proceeding from the alarm central, an intercommunication connection with this dwelling unit can be produced even if the concerned person is not in a position to himself produce such a connection. To this end, a changeover unit with a changeover switch is provided in the alarm location of the locked dwelling unit in a further development of the invention. Therewith, one can change over from an active operating mode in which the person calling for assistance automatically triggers an emergency call report to a passive operating mode. By so doing, it is achieved that a connection to the alarm location can be produced and an intercommunication connection can be established proceeding from the authorized alarm central without further effort of the person in the appertaining dwelling. In this operation mode it is of course also possible to initiate an alarm procedure in the alarm location. Expediently beside the above mentioned emergency facilities further alarm inputs can be provided in the alarm location. Alarm generators, for example, for fire, forcible entry, attack, disruption of an electrical device, and life-systems monitoring of the appertaining person, can be connected to these alarm inputs. These can be interrogated proceeding from the alarm central as to their alarm state and this can be displayed. Of course, the danger alarms also will activate immediately the alarm location in such manner that, independent of the operating mode of the alarm location, a connection is automatically produced to the appertaining alarm central upon the response of a danger alarm and that appropriate alarm conditions are displayed at said alarm central.

Further possibilities of developing the invention are cited in the subclaims.

In the following, the invention is explained in greater detail on the basis of the accompanying drawing sheets; and other objects, features and advantages will be apparent from this detailed disclosure and from the appended claims.

BRIEF DESCRIPTION OF THE DRAWINGS

FIG. 3 is a block diagram of a varied exemplary embodiment with further details; and FIG. 4, consisting of a-c, is a graphical illustration of the chronological sequence for explaining the individual method steps.

DETAILED DESCRIPTION

Figure 1:
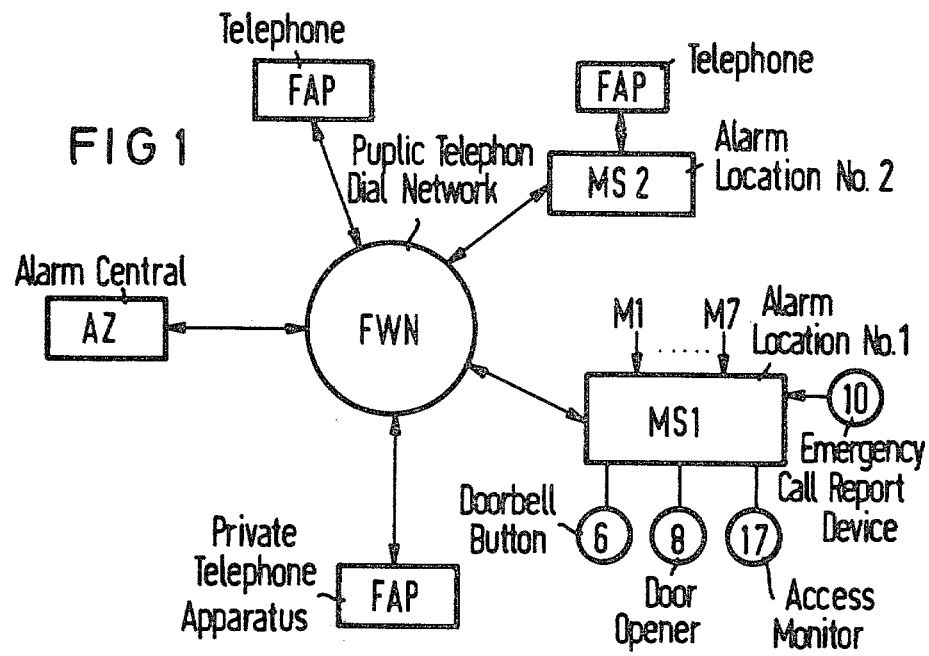
FIG. 1 is a block diagram showing the fundamental format of an emergency assistance communication system.

The fundamental format of the emergency assistance communication system illustrated in FIG. 1 consists of an alarm central AZ, a terminal or alarm location MS, of which two, MS1 and MS2, are illustrated. These are respectively installed as auxiliary devices to the private telephone apparatus FAP. The connection with the two terminal or alarm locations of the system is via the respective public telephone dial network FWN. The elements belonging to an alarm location MS (such as MS1), which are described in greater detail below, are an emergency call report circuit device 10, for example an infrared receiver, additional alarm inputs M1 . . . M7 for danger alarms, a doorbell button 6, a door transmission device 17 for the access monitoring, for example a door loudspeaker for an intercom communication (FIG. 3), and a door opener 8.

Figure 2:
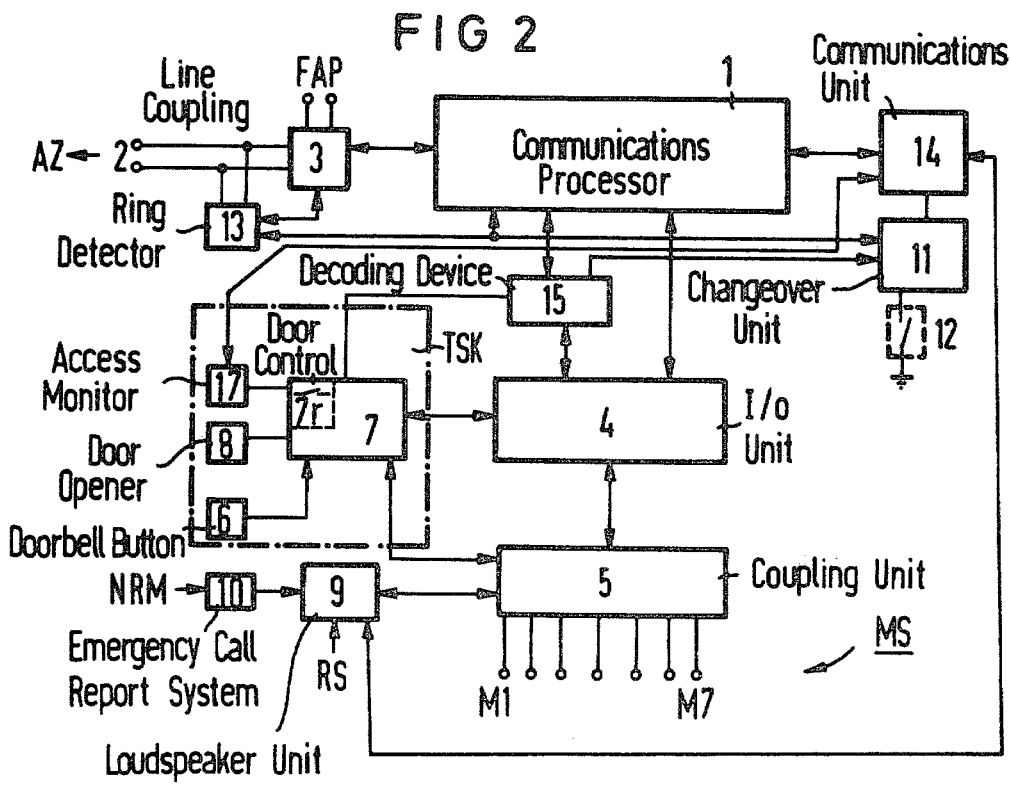
FIG. 2 is a block diagram of the alarm location provided in a locked dwelling unit.

The alarm or terminal location MS illustrated in FIG. 2 may correspond to locations MS1 and MS2 in FIG. 1 and includes a telephone apparatus FAP, a telephone line 2 and a line coupling 3, a communication processor 1 and a communication unit 14. This is assigned, via a plurality of switching elements which will be described later, to a loudspeaker unit 9 with an infrared receiver 10. The communication processor 1 is programmed in such manner that, on the basis of an emergency call report NRM, the alarm location MS is activated and, with the first of a plurality of stored telephone numbers, the connection to the alarm central AZ authorized to receive is automatically produced. This connection completion ensues via the coupling 3 which separates the telephone apparatus FAP from the telephone line 2, via the telephone line 2 itself and via the public telephone dial network FWN to the alarm central AZ. When the connection is completed, then a bi-directional data flow occurs between the alarm location MS and the alarm central AZ. The data are digitally transmitted in the voice band by means of frequency shift keying. It is guaranteed by means of mutual identification of the alarm location and the alarm central that the information is only transmitted between an alarm central authorized to receive and the appertaining alarm location. To that end, a decoding device 15 is allocated to the communication processor 1 in tha alarm location MS. Said decoding device 15 is in turn connected with a door control device 7 and with an input/output unit 4. This input/output unit 4 is connected to the communication processor 1 and to a coupling unit 5. Said coupling unit 5 exhibits a plurality of inputs M1 through M7, for example, for seven alarms. In addition, the coupling unit 5 is connected to the door control device 7.

It is assumed that an emergency call is triggered via a small mobile transmitter. To that end, for example, an infrared transmitter is provided which can be worn at the wrist like a wristwatch and exhibits a press-button keyboard and infrared luminescent diodes. The report location MS exhibits one or more loudspeaker units 9 with a respective infrared receiver 10 allocated to the communications unit 14. The loudspeaker unit 9 and receiver 10 are shown in FIG. 2 as being coupled to the communication unit 14 and via the coupling unit 5, the input/output unit 4 and the communications processor 1. The infrared receiver 10 evaluates the infrared signal transmitted in coded form. This emergency call report signal NRM is transmitted from the alarm location MS to the alarm central AZ, FIG. 1 and may be transmitted by a conventional digital dialer transceiver system which can be an integrated part of the communication processor 1.

When the connection to the alarm central AZ is produced and an emergency call report NRM has been transmitted to the alarm central AZ and displayed, a coded signal is transmitted by the operating personnel from the alarm central AZ to the alarm location MS, said coded signal releasing the emergency assistance communication unit 14 for an intercommunication traffic. The voice traffic ensues via the loudspeaker unit 9 via which the emergency call report NRM ensued by means of the infrared receiver 10, i.e. where there are several assemblies 9, 10 having separate coupling to communications unit 14, preferably only the loudspeaker associated with the emergency call report is connected for two-way voice communication with alarm central. The voice traffic is controlled proceeding from the alarm central AZ. IF the operating person at the alarm central AZ perceives or learns that the person requesting assistance requires a helper, for example an emergency doctor, who must enter the dwelling in order to carry out the assistance, then, proceeding from the alarm central AZ, the door opening procedure is initiated during the intercommunication traffic with a further coded signal, i.e. a doorbell release signal TKF (FIG. 4). That means that the signal is decoded by the decoding device 15 and supplied to a door opening circuit TSK. This is connected to the decoding device 15 and to the input/output unit 4 which is in turn connected to the communication processor 1. The door opening circuit TSK is activated with this signal (TKF, FIG. 4); a doorbell button 6 at the dwelling door is thereby connected to the door control device 7 in such manner that actuation of the doorbell button 6 effects the triggering of the door opening procedure. After termination of the voice traffic, the connection proceeding from the alarm central AZ to the alarm location MS is released.

According to the invention, however, given such a situation, it is now possible to open the access door to the dwelling proceeding from the alarm central when it has been determined in the alarm central that the person who is to offer the assistance is actually situated in front of the access door of the appertaining dwelling unit. The alarm central must now be in a position to determine whether the assisting person has arrived at the access door of the appertaining dwelling unit.

When the helper has arrived at the appertaining dwelling door and actuates the doorbell button 6, then, proceeding from the alarm location MS, a connection is again automatically produced to the alarm central AZ. It is displayed there that the bell has been rung at the appertaining dwelling unit. In order to now guarantee that access to the dwelling unit is only granted to an authorized person, the access authorization is monitored proceeding from the alarm central. An additional intercommunication connection between a door loudspeaker 17 arranged at the dwelling door and the communications unit 14 is produced via the door control device 7 and a changeover relay 7r when the connection is produced from the alarm location to the alarm central. By so doing, a voice communication between that person who is standing in front of the access door to the dwelling and the alarm central is possible. When it has been determined in the alarm central proceeding from this conversation that the helper is indeed standing in front of the access door, a further coded door opening signal (T0, FIG. 4) is transmitted proceeding from the alarm central AZ to the appertaining dwelling unit. This signal is supplied to a door opener 8 via the communication processor 1, the decoding device 15 and the door control device 7, whereby the access door is opened and the helper can enter the dwelling unit.

Further measures are provided in the alarm location by means of which, preferably, acoustical signals can be generated. After an emergency call report NRM has been triggered, a preliminary alarm (VA, FIG. 4) is transmitted during as an acknowledgment signal, for example, a continuous tone, via the loudspeaker 9 allocated to the communication unit 14. In this time reset to the idle position is possible, preventing the local alarm location from taking further actions. In order to reassure the person requesting assistance, a further, preferably acoustical signal is transmitted as a reassurance signal (BS, FIG. 4) as soon as the interconnection with the alarm central is produced, until the emergency alarm is manually reset at the dwelling unit. In order to distinguish it from the preliminary alarm VA, the reassurance signal BS is emitted as a rhythmically interrupted acoustic signal. After arrival of the helper, the reassurance signal BS can be switched off by means of a reset signal RS which, for example, is relayed with a key to the emergency call communication unit 14, and the emergency assistance communication procedure is ended.

However, situations can occur in which it is desirable or necessary that a person in a dwelling unit who lives alone or is handicapped is briefly called by an authorized alarm central AZ at certain time intervals, for example, a number of times per day, in order to determine for example the state of health of the person concerned. Inventively, therefore, the alarm location MS exhibits a changeover unit 11 with an allocated changeover switch 12. Normally, the alarm location is switched to an active operating mode which is characterized as "privacy". With the changeover by actuation of switch 12, one can switch from this acitve operating mode to a passive operating mode which is characterized as "intensive care". Expediently, a key-actuated changeover switch 12 is provided which is actuated by an authorized person, for example, a nurse or social worker or by the occupant himself. Exclusively given this "intensive care" mode of operation, it is possible to produce a connection to the alarm location MS proceeding from the central AZ and to complete an intercommunication connection. To that end, the alarm or terminal location MS exhibits a call tone detector 13 which is connected parallel to the telephone line 2 and is connected to the line coupling 3, the communication processor 1 and the changeover unit 11. The changeover unit 11 is connected to the communication unit 14 and the decoding device 15. If the location MS is called proceeding from the alarm central AZ (via the dial network FWN), then an output signal is generated in response to the incoming call signal (ringing signal) for the telephone apparatus FAP by the call tone detector 13 after reception of a predetermined number of call signals, for example seven (7), said output signal being generated, for example, with the eighth call signal and effecting that the communication processor 1 is connected to the telephone line 2 via the line coupling 3. Therewith, the emergency assistance communication unit 14 is connected after mutual identification between the alarm central and the alarm location, enabling an intercommunication connection between the alarm central and the alarm location. Given the operating mode "intensive care", the door opening procedure is not provided for personal privacy and safety reasons. In this passive operation mode, an emergency call report immediately will temporarily switch the alarm location from the passive to the active operation mode with all the above mentioned facilities.

The alarms (M1 ... M7) which are connectable to the coupling unit 5 can report dangers such as, for example, fire, forcible entry, life signs, etc. The communication processor 1 can be programmed in such manner that, given the response of one of the danger alarms M1 through M7, an automatic connection is immediately, i.e., without the preliminary alarm VA mentioned above, completed from the alarm location MS to the central AZ and the corresponding alarm is displayed at said central AZ in order to bring about further measures.

In FIG. 3, the alarm location MS is similarly constructed as in FIG. 2, and may correspond, for example, to locations MS1 and MS2 in FIG. 1. The line coupling 3 is connected to a hybrid (or fork) circuit GAS. During the intercommunication traffic, a changeover is undertaken by the alarm central to speaking or listening. Together with this changeover, a short audible signal is generated each time in the alarm location, so that the person in the dwelling knows when the changeover has ensued. For the changeover, the alarm location MS exhibits a detector DSH for responding to the changeover signal, for example, a 1800 Hz signal, which drives the changeover switch for speaking/listening USH1 and USH2. The speech channel, as viewed proceeding from the alarm location, proceeds to the hybrid (or fork) circuit GAS from the loudspeaker of the loudspeaker unit 9 via a switch S2 which is controlled by the emergency call logic section 14a of communications unit 14, the changeover switch USH2, an audio amplifier AV with automatic volume control AVC, a notch filter NOF for rejecting eighteen hundred hertz (1800 Hz), the changeover switch USH1, and a summing amplifier SUV. From the hybrid (or fork) circuit GAS, the transmission leads to the alarm central AZ via the line coupling 3 and the public telephone dial network (e.g. FWN, FIG. 1). Proceeding from the hybrid (or fork) circuit GAS, the listening channel (shown as active in FIG. 3) proceeds to the loudspeaker 9 via USH2, the audio amplifier AV, the notch filter NOF, USH1 and the switch S2. If, during the voice traffic, additional data are transmitted from the alarm location to the alarm central, then these are supplied to the second input of the summing amplifier SUV via a digital-/analog converter DAC. Inversely, data are transmitted from the alarm central to the communication processor 1 via the hybrid (or fork) circuit GAS via the bandpass filter BAF or, while bypassing the bandpass filter BAF, by means of switching the switch USH3 for detection of engaged signals. Said data are then further processed by the communication processor 1. The communication processor 1 can consist of one or more microprocessors in which the operating and control program is stored. Further, the decoding device 15 from FIG. 2 may be integrated in the communication processor as represented in FIG. 3. The commands proceeding from the communication processor are decoded by a command decoder BED and supplied to the appropriate logic circuits such as 7a, 7b, and 14a.

The telephone numbers to be dialed to reach the central station AZ, (FIG. 1) and the identification data of the alarm location (local station) are deposited in two identification memories IDSP1 and IDSP2. The first memory is directly allocated to the communication processor 1 and the second is allocated to the communication processor 1 via the input/output unit 4. From the communication processor 1, the appertaining control and command signals are transmitted to the corresponding communication and switching units. In order to generate the preliminary alarm, the reassurance signal and the audio signal in the speaking/listening changeover, a sound generator TONGEN is provided which is connected to the loudspeaker 9 and is controlled by the emergency call logic section 14a of communications unit 14.

An emergency call report NRM arrives via an infrared receiver (10) into the emergency call logic section 14a of communications unit 14 and arrives from there as an emergency call alarm NRA input to the input/output unit 4 for transmission to the communication processor 1 and from there to the alarm central. If the door opening procedure has been initiated (TKF, FIG. 4) proceeding from the alarm central AZ, then this command is relayed via the communication processor 1 to the door control unit 7. The logic section 7a for doorbell release (TKF) in door control unit 7 activates a doorbell circuit TKSK by means of a coupling with switch S3. The doorbell button 6 is also included in said doorbell circuit TKSK. The input E1 for the doorbell circuit is provided at the coupling unit 5. Proceeding from here, the doorbell circuit is conducted via the switch S3 to the input/output unit 4. The switching-on of the switch 7r for the door loudspeaker 17 is likewise controlled by the doorbell release logic section 7a. After the receipt of the corresponding control command from the communication processor 1, the door opener 8 is actuated by the door opening logic section 7b of door control unit 7.

The alarm location is switched over from the active operating mode to the passive operating mode ("intensive care" mode) by means of the changeover switch 12 and the changeover logic 11. Then, the line coupling 3 is correspondingly connected to the call tone detector 13. The latter exhibits a counter which switches the switch S1 on after the seventh call tone. Thus, the signal of the eighth call tone can arrive at the communication processor 1 via switch S1 and bring about the switching-on of the emergency assistance communication or, respectively, of the voice connection.

The coupling unit 5 (which in the embodiment of FIG. 3 may comprise an alarm interface), exhibits yet another input E2. This serves to relay an absence report AWM (indicated in FIG. 3 with a switch) to the alarm location MS. For example, a switch can be built into the lock of the dwelling door which forwards the absence report AWM to the alarm location when the dwelling door is locked (from the outside). By so doing, it can be effected that those alarms which monitor the concerned person as to life signs do not allow an alarm to be forwarded to the central during the absence when one of them responds. Thus, a connection completion from the alarm location to the alarm central is prevented. Such monitoring alarms for life signs can be alarms which respond when the toilet has not been flushed or no electrical switch has been actuated over a certain length of time.

The chronological sequence of the individual method steps is illustrated in FIG. 4. Thereby, the chronological sequence is illustrated at a for steps taking place at the alarm station MS, at b for steps to take place at the alarm central AZ and at c for steps to be executed by the assistance service. At time T1, an emergency call report NRM (arrow), as explained above, is triggered (at receiver 10, FIGS. 1–3) and a preliminary alarm VA is emitted via the loudspeaker unit 9 as an acknowledgment signal for a specific time (for example, 20 seconds). At time T2, the connection from the alarm location MS to the alarm central AZ is completed; a reassurance signal BS is generated instead of the preliminary alarm VA, the mutual identification is undertaken, and the emergency call is transmitted to the alarm central and registered there (referenced with R in part b of FIG. 4). Thereby, an alarm overview is also transmitted to the alarm central, i.e., the alarm states of all alarms connected to the coupling unit 5 of the alarm location, being registered, displayed and classified in the alarm central. At time T3, the emergency assistance communication or, respectively, the intercommunication connection (double arrow) is effected and may last up to time T4 (while the reassurance signal BS is switched off). During this time, the doorbell release TKF (arrow) can ensue proceeding from the alarm central AZ. After termination of the voice connection at time T4, a data transfer, such as alarm overview, doorbell release acknowledgement is transferred to the alarm central and is registered there (as indicated by R subsequent to T4 in part b of FIG. 4); and the reassurance signal BS is again emitted via the loudspeaker 9 in the alarm location. At time T5, the connection between the alarm central and the alarm location is broken off. After time T5, the helper will hurry to the dwelling of the person seeking assistance (indicated by shading in part c of FIG. 4). At time T6, the helper who has arrived at the dwelling door will actuate the doorbell (TKB; arrow). That effects a renewed connection buildup from the alarm location MS to the central AZ with the known data exchange and the doorbell actuation signal which are registered in the alarm central (as indicated by R subsequent to T6 in part b of FIG. 4). After the determination of authorization has ensued during the voice traffic (double arrow) in the time from T7 through T8, and the door opening signal T0 (arrow) has been forwarded from the alarm central to the alarm location, the voice connection is again terminated at time T8, the reassurance signal BS is switched on in the alarm location, the alarm transfer, a signal which confirms the opening of the door, is transmitted to the alarm central and registered (as indicated by R subsequent to T8 in part b of FIG. 4). At time T9, the connection from the alarm central to the alarm location is broken off. Via the reset key RS (arrow), the reassurance signal BS is switched off, the resetting and the alarm overview are transmitted via a further connection buildup to the alarm central and are regulated (as indicated by R following T10). Subsequently, there follows a final disconnection of the connection and a resetting of the communication system.

It will be apparent that many modifications and variations may be effected without departing from the scope of the novel concepts and teachings of the present invention.

SUPPLEMENTAL DISCUSSION

In the disclosed method as shown in FIG. 3, the emergency call report device 10 may comprise an infrared transmitter incorporated in a housing which can be worn at the wrist, with the outer surface of the housing having at least one luminescent diode and at least one key for actuation by the wearer for transmitting an infrared signal to the infrared receiver. Alternatively, the emergency call report device 10 may comprise a manually operable switch associated with the housing of the intercom loudspeaker 9. Where there are a plurality of intercom speakers 9 at different locations, each speaker housing may have a switch which when actuated transmits the emergency call report NRM to the logic 14a, FIG. 3, and also completes an enabling circuit for such loudspeaker 9 by closure of a switch in series with switch S2. As represented generally in FIG. 1, the emergency call report device may be any known device which when actuated serves to automatically notify a central station and provide identification as to the particular location from which the emergency call originates. Preferably such notification takes place via the public telephone dial network as indicated at FWN by means of an automatic digital dialer, such devices being well known in the art.

For the specific example of FIG. 3, where a series of telephone numbers to be dialed in an emergency may be stored at IDSP1, and the local station identification may be stored at IDSP2, the microprocessor 1 may be immediately notified of an emergency call report at 10 via logic 14a, channel 19, input output unit 4, and the input output bus leading from unit 4 to microprocessor 1. The microprocessor 1 then retrieves the first telephone number to be dialed, and initiates the automatic dialing operation, for example via an associated automatic digital dialer which is integrated in the communication processor 1 in FIG. 2 and would have suitable access to the telephone line 2 for example via line coupling 3.

The steps of the disclosed method with respect to FIG. 3 include the following:

(a) After arrival of an emergency call report (NRM) as indicated at the right in FIG. 3, an intercommunication connection is produced between alarm central (AZ) and the alarm location (MS), as indicated at time T3 in FIG. 4 by means of the arrow 20. By way of example the alarm central may include a display means for the numerical display of the calling alarm location as transmitted from memory IDSP2. The alarm central may also be provided with manually operable keys for controlling voice traffic and the transmission of signals to an alarm location with which communication has been established. Upon completion of the connection at time T2, the microprocessor 1 sends on an FSK coded signal from the alarm central the identification for the local station via the digital to analog converter DAC which may operate to transmit a frequency shift coded signal corresponding to the stored local station identification. When the local identification is displayed at alarm central, the operator can initiate two way communication for example at time T3, FIG. 4, by pressing a key for closing switch S2, FIG. 3. As indicated in FIG. 4, this command which may be represented by arrow 20 in FIG. 4 may result in interruption of the reassurance signal BS by transmission of a suitable command from the microprocessor 1 via decoder BED and logic unit 14a to the tone generator TONGEN and S2. The operator at alarm central will then initiate voice communication via switch S2 and loudspeaker 9 and then actuate a key to transmit a 1800 Hertz pulse suitable for actuating changeover signal detector DSH so as to shift the intercom section of communications unit 14 to the opposite mode, and to switch over USH1 and USH2.

(b) If the operator at the alarm central determines that assistance should be sent to the alarm location, the operator may actuate a key for transmitting the coded signal (TKF) for activating the door opening circuit TKSK by closure of switch S3. The microprocessor 1 may send an acknowledgment as indicated at 21 in FIG. 4 acknowledging receipt of the signal (TKF) and a complete status report may be registered at the alarm central following such acknowledgment, whereupon the operator at the alarm central may effect disconnect from the alarm location as indicated by arrow 22 in FIG. 4.

(c) When the person called by alarm central to render assistance actuates the doorbell button (6), microprocessor 1 is so advised and again establishes a connection to the alarm central as indicated by arrow 23 in FIG. 4. The microprocessor may transmit the signal (TKB) via the digital to analog converter DAC, and the signal TKB may thus be registered at alarm central.

(d) As indicated by arrow 24 at time T7 in FIG. 4, voice communication may now be established via a door transmission device 17 arranged at the door of the closed dwelling unit for the purpose of assuring the operator at alarm central that the authorized person has arrived at the dwelling unit. As an alternative, the door transmission device 17 may be formed as a radio transmitter and receiver arranged at the door of the dwelling unit and having direct communication with alarm central. As another alternative, the door transmission device (17) may be in the form of a coded locking device, in which case the authorized person arriving at the dwelling unit would be advised of the number sequence or the like required for operating the door transmission device.

(e) After determination that the authorized person has arrived at the door of the dwelling unit, the opening of the door 8 is brought about proceeding from alarm central by means of a further coded signal T0 which may be produced by actuation of a further key and which causes the microprocessor 1 to activate logic section 7b via decoder BED for the purpose of unlocking the door. The same logic signal T0 may cause the microprocessor to activate logic section 7a to effect opening of switch S3 so as to switch off circuit TKSK. The microprocessor 1 may send an acknowledgement signal as indicated at 25 in FIG. 4 showing receipt of the coded signal T0, whereupon the status information can again be automatically recorded and displayed at the alarm central. The operator at alarm central may then terminate the connection at time T9, FIG. 4, as indicated by arrow 26.

With respect to the graphical illustration of the disclosed method in FIG. 4, the microprocessor 1 upon receipt of an emergency call report NRM, may not only initiate the automatic dialing of the alarm central after a prelimanery alarm period of say: 20 seconds, but may also via decoder BED and logic 14a energize the tone generator TONGEN to supply a preferably acoustical acknowledgment signal VA until the prelimanery alarm period is passed at time T2. Similarly when the connection with alarm central is produced as indicated by arrow 27 at time T2, the microprocessor 1 may not only transmit desired signals to alarm central after the connection with the alarm central is completed but may also switch over the tone generator TONGEN to an interrupted signal as indicated at BS during the identification and data transmission procedure R FIG. 4. The interruption of the reassurance signal BS may informe the occupant of the dwelling unit that switch S2, FIG. 3, has been closed for two-way communication.

The shaded area at 30 in FIG. 4 at part b may represent the interval of emergency assistance communication under the control of the operator at alarm central. The arrow at 31 may represent the dispatch of assistance by means of a suitable assistance service whose activities are indicated at part c in FIG. 4. Thus, shaded area 32 in FIG. 4 may represent a time interval during which the person called to render assistance in traveling to the dwelling unit represented by location MS. The arrow at time T6 in FIG. 4 may represent the time of arrival of the person called to render assistance at the dwelling unit, while the interval 34 may represent the time during which there is an emergency assistance communication taking place via the door transmission device 17, FIG. 3, between the person arriving at the dwelling unit and the operator at alarm central. This communication is for the purpose of establishing the identity of the person at the door transmission device 17 so that access authorization can be transmitted as indicated at T0 from alarm central to the alarm location MS. The time interval 35 at part c of FIG. 4 thus indicates the time during which the helping person is at the dwelling unit for the purpose of rendering assistance. Such time interval can be regarded as coming to an end at time T10 when the alarm location is reset into its idle condition as represented at RS in FIG. 4. Subsequent care which may be provided by the helping service is indicated at 36 in FIG. 4.

It should be understood that the emergency assistance communication procedure as indicated at 30 in FIG. 4 and the door opening procedure as indicated at 34 can be interrupted at any time by actuation of the reset switch RS, FIG. 3, whereby the alarm location MS is reset to its idle condition, and a report as indicated at 37 transmitted to alarm central. Such a connection as indicated at 37 is then terminated by the operator at alarm central as indicated by arrow 38 in FIG. 4, for example after a review of a status report to the alarm central from the microprocessor 1. The microprocessor 1 may, of course, respond to the reset switch RS to discontinue the reassurance signal BS.

With switch 12 actuated to place the alarm location MS in the "intensive care" mode, the call tone detector 13 may be connected with the telephone line 2 at line coupling 3 so as to enable the initiation of communication at the alarm central AZ for the purpose of a periodical communication contact with the occupant of the local alarm. If desired, the system may be so programmed that with closure of switch S1, the microprocessor 1 can be instructed to close switch S2 for intercommunication via loudspeaker unit 9.

For reasons of personal privacy and safety it is yet not possible to start the door disclosure procedure as long as there is no emergency call report. Next to all this, it is possible to connect other kinds of alarm devices on the coupling units. When the alarm situation at these inputs changes, a connection with the alarm central is produced to indicate this together with the identification number of the local alarm.

The alarm central may of course be equipped with a sound recording device or the like for recording voice intercommunication with the alarm locations, as well as conventional interface circuitry so as to enable automatic monitoring, with suitable priority, for the various types of possible alarm conditions at a large number of alarm locations. In this way, there can be an automatic response to selected alarms with automatic notification of a suitable assistance service such as represented at part c in FIG. 4.

We claim as our invention:
1. In an emergency assistance system,
   an alarm central for monitoring for incoming emergency call reports (NRM) and operable to transmit coded signals including a coded communication control signal, a coded preliminary signal (TKF) and a coded door access signal (T0), and operable to send and receive voice communications,
   an alarm location for installation in a closed dwelling unit and having communication means providing for the reception of said coded signals from said alarm central and for two-way voice communication with said alarm central,
   an emergency call report device at said alarm location for initiating the transmission of an emergency call report to said alarm central via said communications means, when a person at the dwelling unit actuates said device to signal a need for emergency assistance,
   said communication means at said alarm location being responsive to the coded communication control signal from said alarm central for automatically establishing two-way voice communication between said alarm central and said alarm location via said communications means, whereby said alarm central can respond to an emergency call report by establishing voice communication with the person in need of emergency assistance, and doorbell response means for connection with a doorbell of the closed dwelling unit, and responsive to said coded preliminary signal (TKF) from said alarm central, and operable after receipt of said coded preliminary signal (TKF) to notify said alarm central when the doorbell is thereafter actuated, so that alarm central is notified when a person summoned to render assistance has actuated the doorbell, and door access control means at said alarm location and automatically responsive to said coded door access signal from said alarm central for enabling access to the dwelling unit, whereby said alarm central has selective control of access to the dwelling unit and can authorize access after notification via the doorbell response means.

2. A system according to claim 1, with door access transmission means (17) at an access door of the dwelling unit for monitoring the access authorization of a person arriving at the dwelling unit, and operable for transmitting information to said alarm central to verify the access authorization of a person actuating the doorbell of the dwelling unit after alarm central has transmitted said coded preliminary signal (TKF).

3. An emergency assistance system according to claim 2, with said door access transmission means comprising radio transmitter means providing for communication between a person arriving at the access door of the dwelling unit and said alarm central.

4. An emergency assistance system according to claim 2, with said door access transmission means (17) having changeover means (7r) for effecting activation of the door access transmission means (17) when a person summoned to render assistance is at the access door.

5. An emergency assistance system according to claim 2, with said door access transmission means comprising intercommunication loudspeaker means (17) arranged at the access door of the dwelling unit and providing for two-way voice communication between a person arriving at the access door of the dwelling unit and said alarm central.

6. An emergency assistance system according to claim 1, with line coupling means arranged at a telephone line in series with a private telephone apparatus and processor means connected to said line coupling means for receiving said coded signals from said alarm central via said line coupling means, said processor means having means comprising decoding means for effecting control operations at the alarm location in response to said coded signals.

7. An emergency assistance system according to claim 1, with said alarm location having door transmission means arranged at a dwelling door such that a person arriving at the dwelling unit can communicate via the door transmission means with the alarm central prior to transmission by said alarm central of the coded door access signal (T0).

8. A system according to claim 1, with intercommunication means at an access door of the dwelling unit for monitoring for access authorization of a person arriving at the dwelling unit, and providing for two-way communication between a person arriving at the access door and said alarm central.

9. An emergency assistance system according to claim 1, with a locking device at a door of the dwelling unit for operation by a person arriving at the dwelling unit in order to obtain access thereto.

10. An emergency assistance system according to claim 1, with said emergency call report device comprising an infrared receiver which can be actuated to initiate an emergency call report and a mobile infrared transmitter to be carried by a person occupying the dwelling unit for selective actuation of said infrared receiver.

11. An emergency assistance system according to claim 10, with said mobile infrared transmitter comprising at least one luminescent diode, and a key switch for controlling energization of said luminescent diode.

12. An emergency assistance system according to claim 1, with said alarm location having a two-way communication loudspeaker unit connected with said communication means for providing said two-way voice communication with said alarm central, said emergency call report device comprising an infrared receiver associated with said two-way communication loudspeaker unit.

13. An emergency assistance system according to claim 1, with said alarm location having a call tone detector for connection with a telephone line of the dwelling unit, and operable for controlling a connection of the telephone line with said alarm location in a passive operating mode, and changeover means at said alarm location for effecting a changeover to said passive operating mode wherein said alarm central can establish communication with said alarm location by means of said call tone detector without further action at said alarm location.

14. An emergency assistance system according to claim 1, with line coupling means arranged at a telephone line for coupling of said alarm location with said alarm central via the telephone line, the processor means for connection to said telephone line via said line coupling means and having at least one danger alarm input for sensing a danger alarm condition at said alarm location, said processor means having interface means for connecting said danger alarm input therewith, whereby said alarm central can be advised as to the existence of said danger alarm condition at said alarm location via the telephone line.

15. Method for reporting emergency calls and initiating emergency assistance measures by means of protected, coded data transmission between one or more alarm centrals authorized to receive emergency calls and at least one alarm location via a communication network, the alarm location being installed in a closed dwelling unit and having an emergency call report device which is normally in a reset condition, and an emergency assistance communication unit allocated to it whereby, on the basis of an emergency call report which results in a set condition of the emergency call report device, a connection to the alarm central is automatically completed and, by means of previous, mutual identification, it is assured that the emergency call and further information are only transmitted to the authorized alarm central, characterized by the following method steps:

(a) after the alarm location (MS) responds to an emergency call report (NRM) and transmits an emergency call to the alarm central (AZ), a communication connection for two-way voice communication is produced between the alarm central (AZ) and the alarm location (MS), said two-way voice communication via said communication connection being controlled from the alarm central (AZ);

(b) a controlled door opening procedure is initiated by the alarm central (AZ) by transmitting a coded signal (TKF) for activating a door opening control circuit (TSK, FIG. 2; TKSK, FIG. 3) to the alarm location (MS) and, after termination of the voice communication, the connection is disconnected;

(c) after actuation (TKB) of a doorbell button (6) of the closed dwelling unit, a connection from the alarm location (MS) to the alarm central (AZ) is again produced by the activated door opening control circuit (TKS, FIG. 2; TKSK, FIG. 3), and the actuation of the doorbell button is reported to said alarm central;

(d) an access authorization of a person coming to assist is monitored by the alarm central (AZ) by means of a door voice and/or data transmission device (17) arranged at the door of the closed dwelling unit;

(e) after determination of authorization, the opening of the door (8) is brought about from the alarm central (AZ) by means of a further coded signal (T0); and (f) after manual resetting of the emergency call report device at the alarm location (MS) a last connection with the alarm central is produced by the alarm location (MS) in which this resetting is reported by coded signals and is printed out in the alarm central to indicate that no further aid is needed, and the connection is released.

16. Method according to claim 15, characterized in that, after an emergency call report (NRM), the alarm location (MS) transmits an acoustical acknowledgement signal (VA) until the communication connection is produced.

17. Method according to claim 15, characterized in that, after termination of the communication connection until the arrival of a helper, the alarm location (MS) emits an acoustical reassurance signal (BS) locally until the emergency call report device at the alarm location (MS) is restored to its reset condition (RS).

18. Method according to claim 15, characterized in that the door opening procedure already initiated can be stopped at any time at the alarm location (MS), by restoring the emergency call report device at the alarm location to its reset condition (RS).

19. Method according to claim 15, characterized in that the alarm location (MS) is selectively operated in a passive operating mode by actuating a changeover switch (12) whereupon a connection to the alarm location (MS) is produced from the alarm central (AZ) and the emergency assistance communication unit (14) is connected such that two-way voice communication between the alarm central (AZ) and the alarm location (MS) is possible without further action at the alarm location (MS).

* * * * *